United States Patent Office 3,699,049
Patented Oct. 17, 1972

3,699,049
PROCESS FOR MAKING SILICA ORGANOSOLS
Linda J. Pluta, North Riverside, and Peter H. Vossos, Lisle, Ill., assignors to Nalco Chemical Corporation, Chicago, Ill.
No Drawing. Filed Feb. 4, 1971, Ser. No. 112,814
Int. Cl. B01j 13/00
U.S. Cl. 252—309                                    9 Claims

ABSTRACT OF THE DISCLOSURE

A process for making silica organosol compositions comprising from 5 to 50% by weight of silica particles as $SiO_2$ and from 50 to 95% of a water miscible polyhydric alcohol is disclosed. Preferably, the water miscible polyhydric alcohol is glycerol.

INTRODUCTION

Aqueous silica sols and silica organosols are known to those skilled in the art. But there is a need in the art to produce silica organosols from aqueous silica sols by a simple and efficient one-step process. A method is needed to produce stable organosols which contain at least 5% by weight of silica particles. Such silica organosols should be stable for a comparatively long time.

Some silica organosols are well known in the art. These organosols are used in lubricating oils and greases, fillers for rubber products, and thickening agents in certain organic systems. Organosols are beneficial in preparing water repellent coatings for a variety of surfaces such as textiles, plastics, rubber and similar products. These sols can also be used for fine polishing.

The organosols known to those skilled in the art have many inherent disadvantages. In Iler U.S. Pat. 2,801,185 a method is shown of preparing finely-divided colloidal silica dispersed in organic liquids. The process uses aqueous silica sols as starting materials. However, it is necessary to work with dilute aqueous sols and to carry out various reaction steps before the end products are produced. Therefore, it would be a great advantage in the art if there was a method of producing organosols using concentrated aqueous sols and a simple one- or two-step process. These organosls would have to be stable over a long period of time.

There is also a great need in the art to produce an organosol in which the organic solvent has great utility, such as being water miscible and also miscible with a large variety of other organic solvents, such as alcohols.

There is also a great need in the art to prepare coated silica organosols, such as tin oxide and aluminum oxide coated silica sols in glycerol. Other coated sols include a combined tin oxide and aluminum oxide coated silica sol.

There are some methods in the prior art of making silica sols in polyhydric alcohols, such as those disclosed in U.S. Pat. 2,921,913. The main disadvantage of this method is that a complicated multi-step process is used. First of all the aqueous sol must be deionized. Then, the water is removed by vacuum distillation, after the alcohol has been added. Surface esterification occurs on the silica particles. There is a need to develop a simple method of displacing the water for the polyhydric alcohol without performing a complex, multi-step process.

OBJECTS

It is an object of this invention to provide a method of making silica organosol compositions by a simple one-step process. It is a further object of this invention to provide a relatively easy method of making concentrated silica organosols.

Another object is to provide a silica organosol that is miscible with water and many organic solvents.

It is a further object to provide an easy method of making coated silica sols in a polyhydric alcohol. A more specific object is to prepare tin oxide, aluminum oxide and a combined tin oxide and aluminum oxide coated silica sols in glycerol.

THE INVENTION

This invention comprises a method of preparing a silica organosol composition containing from 5 to 50% by weight of silica as $SiO_2$ and from 50 to 95% by weight of a water miscible polyhydric alcohol. Preferably, the silica particles comprise from 15 to 35% by weight of the composition. Preferably, the polyhydric alcohol is glycerol.

A method of preparing organosols comprises the steps of:

(1) Adding an aqueous sol having a silica content of from 20 to 60% by weight as $SiO_2$ to a water miscible polyhydric alcohol;
(2) Removing the water by vacuum distillation; and
(3) Recovering the silica organosol product.

The aqueous sol has a silica content of up to 60% by weight, and preferably ranges from 30 to 60% by weight. The sol can be a silica sol, a tin oxide coatel silica sol, an aluminum oxide coated silica sol, or even a combination of a tin oxide and aluminum oxide coated silica sol. Various means of addition can be used. For instance, all of the water miscible polyhydric alcohol can be added to the reaction vessel at the beginning. Alternately some of the water miscible polyhydric alcohol can be placed in the reaction vessel initially. The sol can be either added before, after, or with the water miscible polyhydric alcohol. During the vacuum distillation as the water is removed, additional alcohol can be fed to the reaction vessel. If additional alcohol is fed to the reaction vessel, the amount of additional alcohol ranges from about 20 to 110% by weight based on the weight of the initial alcohol used. Distillation occurs at a temperature of from 50 to 100° C. The alcohol replaces the water that is removed by distillation.

In the distillation step, vacuum may or may not be necessary. If a deionized sol is used, vacuum distillation is not necessary. If the beginning aqueous sol has not been deionized, and is therefore a typical alkali-stabilized colloidal silica sol, vacuum distillation is necessary, so that surface esterification does not occur.

The final organosol product contains from 5 to 50% silica particles and preferably from 5 to 25% silica particles as $SiO_2$.

WATER MISCIBLE ORGANIC ALCOHOLS

The water miscible alcohols used in the processes of this invention are primary polyhydric alcohols. These alcohols act as carriers for the silica particles after the removal of the water. There may be characterized by the following structural formula:

$$(HO-R)_n-\overset{\overset{\displaystyle R'_{(2-n)}}{|}}{C}HOH$$

where R and R' are aliphatic hydrocarbon radicals of from 1 to 4 carbon atoms in chain length and $n$ is an integer of from 1 to 2 in value.

Preferably, $n$ is equal to 2 and R is a methylene group, and therefore, the polyhydric alcohol is glycerol.

STARTING AQUEOUS SILICA SOLS

Generally, an aqueous silica sol is used for this invention. These are well known to the art. The starting aqueous silica sol can range from 20 to 60% by weight of discrete, dense colloidal particles of amorphous silica.

The average particle diameter can range from 3 to 150 millimicrons and can have an average surface area from 20 m.²/g. to 1000 m.²/g. The starting aqueous silica sol contains up to 60% by weight of discrete, dense colloidal particles of amorphous silica, and preferably from 30 to 60%. The preferred particle diameter should range from 17 to 25 millimicrons and have an average surface area from 120 to 176 m.²/g.

The following is a table of commercially available aqueous silica sols. These are sold by Nalco Chemical Company under the trademark Nalcoags.

TABLE I

| Nalcoag | 1030 | 1034A | 1035 | 1050 | 1060 | 1130 | 1140 |
|---|---|---|---|---|---|---|---|
| Percent colloidal silica, as SiO₂ | 30 | 34 | 35 | 49 | 50 | 30 | 40 |
| pH | 10.2 | 3.1 | 8.6 | 9.0 | 8.5 | 10 | 10 |
| Avg. particle size, millimicrons | 11–16 | 16–22 | 16–22 | 17–25 | 50–70 | 8 | 15 |
| Avg. surface area, M.²/gram | 190–270 | 135–190 | 135–190 | 120–176 | 43–60 | 375 | 200 |
| Specific gravity at 68° F | 1.025 | 1.230 | 1.255 | 1.385 | 1.390 | 1.214 | 1.296 |
| Viscosity at 77° F., cps | <5 | <5 | 5 | 70 | 5–10 | 7 | 8 |
| Na₂O, percent | 0.40 | <0.01 | 0.10 | 0.30 | 0.10 | 0.65 | 0.40 |

Following are illustrative examples showing the preparation of organosols of this invention.

Example I

Five hundred milliliters of Nalcoag 1060, as described in Table I, were placed in a reaction vessel with 1000 ml. of glycerol. The water was removed under vacuum of from 28 to 29 inches. When the glycerol began to come over, the distillation was discontinued. Approximately 300 milliliters of water were removed. The product contained 22% by weight of silica. There was no reaction between the silica and the glycerol, but the glycerol was merely used to replace the water.

Example II

Two hundred twenty five milliliters of Nalcoag 1034A, as described in Table I, were placed in a reaction vessel with 300 ml. of glycerol. This was heated to boiling and 180 ml. of water was removed without vacuum. The product contained 20% by weight of silica. There was no reaction between the silica and the glycerol but the glycerol was merely used to replace the water.

Example III

Nine hundred fifty milliliters of Nalcoag 1130, as described in Table I, were placed in a reaction vessel with 1000 ml. of glycerol. About 800 ml. of water was removed by vacuum distillation at a pressure of 100 mm. of mercury and a temperature of 52° C. The product showed no reaction and 22% by weight solids, 1.389 specific gravity, 2400 viscosity, a particle diameter of 8 millimicrons and 2.3% by weight water.

Example IV

An aqueous tin oxide coated sol was prepared as described in U.S. Pat. 2,892,797 using 1200 grams of Nalcoag 1034A, 600 ml. of water, and 300 ml. of 1 normal Na₂SnO₃·3H₂O. The pH was reduced to 9.4.

The above prepared tin oxide coated sol was added to 1000 ml. of glycerol and the water was removed under vacuum distillation as described in Example III. The product showed no reaction and contained 18.5% by weight solids, and had a specific gravity of 1.366, a viscosity of 800, a particle diameter of 25 millimicrons and 3.7% by weight of water.

Example V

An aqueous tin oxide and aluminum oxide coated silica sol was prepared by diluting 1850 milliliters of Nalcoag 1034A with 250 ml. of deionized water. One thousand milliliters of 1 normal Na₂SnO₃ and 25 milliliters of liquid sodium aluminate containing 42.5% solids were mixed and added dropwise with good mixing to the diluted Nalcoag 1034A.

The pH was reduced to 9.5 and added to 1000 milliliters of glycerol. The water was removed by vacuum as described in Example III.

The product showed no esterification and had a solids content of 17% by weight, a specific gravity of 1.352, a viscosity of 1100, a particle diameter of 25 millimicrons and 3.7% by weight of water.

One of the unique features of this invention is the fact that the salt content and/or the caustic content makes no difference. If the salt or caustic content is too high to allow the process to be conducted by regular distillation, vacuum distillation can be easily employed to practice the process of this invention.

What is claimed and desired to be protected by Letters Patent is:

1. A method of preparing organosols which comprises the steps of:
   (A) adding an aqueous sol having a silica content of from 20 to 60% by weight as SiO₂ to a water miscible polyhydric alcohol;
   (B) removing the water by distillation; and
   (C) recovering the organosol product.

2. The method of claim 1 wherein the product comprises from 5 to 50% by weight of silica.

3. The method of claim 1 wherein the water miscible polyhydric alcohols is glycerol.

4. The method of claim 1 wherein the aqueous sol is a tin oxide coated silica sol.

5. The method of claim 1 wherein the aqueous sol is a combination of a tin oxide and aluminum oxide coated silica sol.

6. The method of claim 1 wherein the aqueous sol is an aluminum oxide coated silica sol.

7. The method of claim 1 wherein the distillation is vacuum distillation and the aqueous sol is an alkali-stabilized silica sol.

8. The method of claim 1 wherein the aqueous sol is a deionized sol.

9. The method of claim 8 wherein the deionized sol has a SiO₂/Na₂O ratio in excess of 40:1.

References Cited

UNITED STATES PATENTS

| 1,922,006 | 8/1933 | von Hoessle | 252—309 |
| 2,377,840 | 6/1945 | Healey | 252—309 |

JOHN D. WELSH, Primary Examiner